United States Patent
Siraky

(10) Patent No.: US 8,294,454 B2
(45) Date of Patent: Oct. 23, 2012

(54) POSITION MEASURING DEVICE

(75) Inventor: Josef Siraky, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 571 days.

(21) Appl. No.: 12/457,876

(22) Filed: Jun. 24, 2009

(65) Prior Publication Data

US 2009/0322318 A1     Dec. 31, 2009

(30) Foreign Application Priority Data

Jun. 27, 2008   (EP) .................................... 08011647

(51) Int. Cl.
    *G01P 3/48*  (2006.01)
(52) U.S. Cl. ................. 324/166; 324/207.25; 324/76.19
(58) Field of Classification Search .................. None
    See application file for complete search history.

(56) References Cited

U.S. PATENT DOCUMENTS

| | | | |
|---|---|---|---|
| 6,011,389 A | 1/2000 | Masreliez et al. | |
| 7,218,106 B2 * | 5/2007 | Yasuhara et al. | 324/307 |
| 2007/0029470 A1 | 2/2007 | Schroter et al. | |

FOREIGN PATENT DOCUMENTS

| | | |
|---|---|---|
| DE | 36 05 789 C1 | 4/1987 |
| DE | 43 45 123 C1 | 4/1995 |
| DE | 43 41 190 A1 | 6/1995 |
| DE | 196 45 605 A1 | 5/1998 |
| DE | 198 36 003 A1 | 2/2000 |
| DE | 199 33 963 A1 | 2/2001 |
| DE | 100 18 269 A1 | 10/2001 |
| DE | 197 03 735 C2 | 2/2002 |
| DE | 102 57 974 A1 | 10/2003 |
| EP | 0 628 789 A1 | 12/1994 |
| EP | 1 126 248 A2 | 8/2001 |
| EP | 1 462 757 A1 | 9/2004 |

OTHER PUBLICATIONS

Office Action issued on Dec. 16, 2011 in counterpart European Patent Application No. 08 011 647.8.

* cited by examiner

*Primary Examiner* — Melissa Koval
*Assistant Examiner* — Trung Nguyen
(74) *Attorney, Agent, or Firm* — The Nath Law Group; Jerald L. Meyer; Stanley N. Portigal

(57) ABSTRACT

Disclosed is a position measuring device, comprising: a first and second solid measure and a first and second scanning mechanism, wherein: the first and second solid measure and the first and second scanning mechanism are respectively designed identically but mirrored in a plane including the direction of measurement and perpendicular to the direction that is not measured; the first and second solid measure are mounted in a fixed opposite position in a direction that is not measured; the first and the second scanning mechanism are mounted in a fixed opposite position in the direction that is not measured; and the scanning signals generated by the first and second scanning mechanisms respectively are electronically combined into an output scanning signal.

7 Claims, 1 Drawing Sheet

POSITION MEASURING DEVICE

Figure 1:
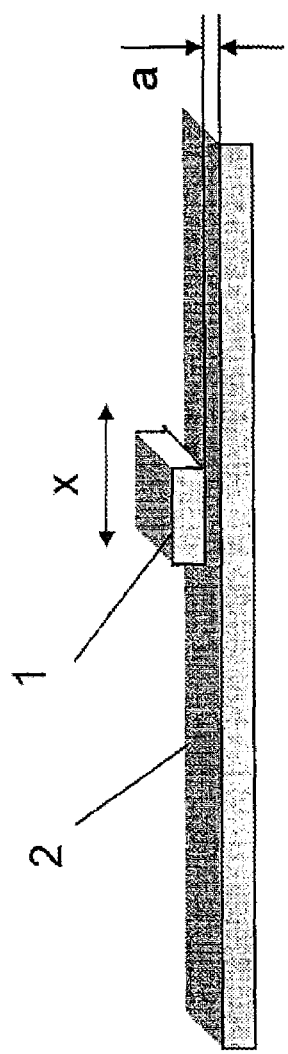

The invention concerns a position measuring device according to the generic term of claim 1.

Such position measuring devices are used to measure relative linear or rotatory positions between two objects. A solid measure is connected with one of these objects and a scanning mechanism with the other object. Corresponding to the change in the position of the objects, the solid measure and the scanning mechanism can be displaced relative to each other in the direction of measurement. While the solid measure is being scanned by the scanning mechanism, electrical scanning signals are generated depending on the position, which are conveyed to a subsequent electronic device, for example, a numeric control device. The quality of the scanning signal depends on the scanning distance between the solid measure and the scanning mechanism, i.e. on their distance from each other in the direction that is not measured, which is perpendicular to the direction of measurement. In order to obtain optimal scanning signals, this scanning distance must maintain a specified value as exactly as possible. On the one hand, this distance may not become too small, as otherwise a mechanical contact between the solid measure and the scanning mechanism could occur. On the other hand, if the scanning distance exceeds the specified value, the scanning signal then increasingly deteriorates, so that this scanning signal no longer makes it possible to perform a reliable discrimination between the separation of the solid measure, and the resolution of the position measuring device deteriorates.

For this reason it is known, for example from DE 198 36 003 A1, to adjust the scanning distance between the solid measure and the scanning mechanism mechanically. From EP 1 126 248 B1 it is further known that this mechanical adjustment has to be controlled automatically corresponding to the scanning signals that are received. These mechanical adjustments increase the design effort of the position measuring device.

The invention is based on the objective of creating a position measuring device that permits larger tolerances with respect to the scanning distance with a smaller design effort.

In accordance with the invention, this problem is solved by a position measuring device with the characteristics of Claim 1.

Advantageous embodiments of the invention are identified in the subordinate claims.

The essential idea of the invention is to double the arrangement of the solid measure and the scanning mechanism in such a manner that a first solid measure and a first scanning mechanism are complemented by a second solid measure and a second scanning device in otherwise identical position, mirrored in a plane that includes the direction of measurement and is perpendicular to the direction that is not measured. The first and second solid measure are mounted mechanically fixed in opposite position to each other and likewise the first and second scanning mechanism are mounted mechanically fixed in opposite position to each other. The scanning signals generated by the two scanning mechanisms are electronically combined into a total output scanning signal, preferably added.

The mirroring mechanism of the two solid measures and the two dedicated scanning mechanisms has the consequence that the scanning distance between the first solid measure and the first scanning mechanism changes in complementary manner between the second solid measure and the second scanning mechanism. The sum of the first scanning distance between the first solid measure and the first scanning mechanism and the second scanning distance between the second solid measure and the second scanning mechanism thus remains constant, even when mechanical tolerances during the operation of the position measuring device displace the solid measure and the scanning mechanisms against each another in the direction that is not measured. If the scanning signal that is generated by the first scanning mechanism deteriorates because the first scanning distance increases, the scanning signal that is generated by the second scanning mechanism improves, because the second scanning distance becomes complimentarily smaller. The combination of the two scanning signals thus results in a total output scanning signal that is always sufficient, which makes a reliable discrimination of the separate measurements of the solid measure possible. The position measuring device can therefore show larger mechanical tolerances in the direction that is not measured and thus be manufactured more economically without thereby impairing the resolution and the reliability.

According to the invention, the solid measure and the scanning mechanism can be designed in all embodiments per se. Details of the design of the solid measure and the scanning mechanism are not important for the invention and therefore do not need to be described in detail.

The solid measure and the scanning mechanism can work together optically, whereby a light transmitted by the scanning mechanism reflects modularly from an optical structure of the solid measure and is received by the scanning mechanism. The discrimination of the modulated light that is received depends on the scanning distance between the solid measure and the scanning mechanism.

The solid measure and the scanning mechanism can work together capacitively. Conducting surfaces of the solid measure and the scanning mechanism thereby work corresponding to their respective overlap in the direction of measurement as capacitors with a capacity that depends on the position. In addition to the desired dependence on overlap in the direction of measurement, the capacity depends on the scanning distance, i.e. on the distance of the capacitor surfaces.

The solid measure and the scanning mechanism can work together magnetically. Hereby, magnets of the solid measure act upon the scanning mechanism, whereby the effective magnetic field strength depends on the scanning distance.

The solid measure and the scanning mechanism can work together inductively. Hereby the material and/or the surface structures of the solid measure influence the inductive reactance of the inductors of the scanning mechanism. Here too, the inductive influence depends on the scanning distance.

Depending on the design and application, the mirrored arrangement of the first and second solid measure and the scanning mechanism can be selected in such a way that the scanning mechanisms are mounted in the direction that is not measured between the solid measures or that the solid measures are mounted between the scanning mechanisms. Important is only that the first solid measure and the first scanning mechanism, as well as the second solid measure and the second scanning mechanism are designed identically except for the mirrored arrangement, so that, disregarding amplitudes that depend on distance, the same signals are generated by both scanning mechanisms. The first and the second solid measure are mounted at a fixed opposite distance at a first device that is being measured, while the first and the second scanning mechanism is mounted in an opposite fixed arrangement at the second device that is being measured.

Figure 2:
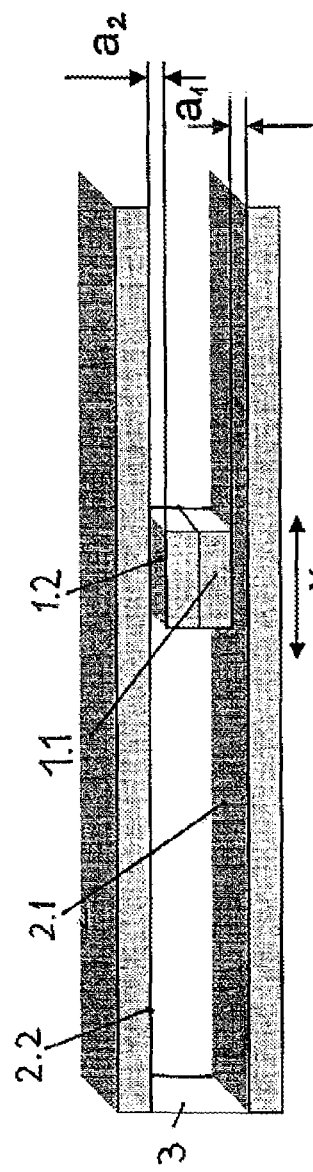

In the following, the invention is explained in more detail with the help of an example of an embodiment that is schematically shown in the drawing. Shown are:

FIG. 1 the basic design of a position measurement device according to prior art, and FIG. 2 the basic design of a position measurement device according to the invention.

In FIG. 1, a position measurement device is shown as per prior art.

This position measurement device shows a solid measure 2 that is scanned by a scanning mechanism 1. The solid measure 2 and the scanning mechanism 1 are mounted on objects that can be displaced against each other, so that the solid measure 2 and the scanning mechanism 1 can be displaced relative to each other in the direction of measurement that is indicated in the drawing by arrow X. The solid measure 2 and the scanning mechanism 1 are designed as optic, capacitive, inductive or magnetic measurement devices in ways that are know per se, in which the scanning mechanism 1 generates dependent scanning signals from the opposite position to scanning mechanism 1 and solid measure 2, which are conveyed to subsequent electronics, e.g. a numeric control device. In the drawing, the solid measure 2 is shown linearly, so that the scanning mechanism 1 and the solid measure 2 can be displaced linearly against each other. Of course, the position measuring device can also be designed as rotatory measuring device, in which the solid measure is, for example, located on a circular disk and the scanning mechanism 1 and solid measure 2 are displaced coaxially rotating against one another.

The scanning mechanism 1 scans the solid measure 2 without contact. Accordingly, the scanning mechanism 1 has a scanning distance a from solid measure 2 in the direction that is not measured which is perpendicular to the direction of measurement X. According to the physical principle of scanning, the scanning signals generated by scanning mechanism 1 depend on this scanning distance a. If the scanning mechanism 1 and the solid measure 2 displace against each other in the direction of measurement X, the scanning distance a can change based on the mechanical tolerances. This change of scanning distance a leads to a change of the scanning signals, whereby especially an increase of the scanning distance a leads to a deterioration of the scanning signals. This deterioration of the scanning signals can impair the discrimination of the scanning signals and thus the precision of the measurement of the position and its resolution. Accordingly, it is required as per the prior art shown in FIG. 1, to make high demands on the mechanical properties and bearings of the scanning mechanism 1 and the solid measure 2 in order to maintain tolerances that are as narrow as possible with respect to the scanning distance a.

This problem is solved by the position measurement device according to the invention that is shown in FIG. 2.

To the extent the position measurement device in accordance with the invention agrees with the prior art shown in FIG. 1, reference is made to the preceding description. Particularly, the position measuring device in accordance with the invention can also be designed linearly or rotatory and the scanning can be based on optical, inductive, capacitive or magnetic principles.

In contrast to prior art, in accordance with the invention, a first solid measure 2.1 and a second solid measure 2.2 are provided. These solid measures 2.1 and 2.2 are at a distance from each other in the direction that is not measured, which is perpendicular to the plane of the solid measures and to the direction of measurement X. The solid measures 2.1 and 2.2 are mounted mechanically fixed with respect to each other at this distance, as is indicated schematically in FIG. 2, by connection 3. The solid measures 2.1 and 2.2 can, for example, be mounted on surfaces facing each other on carrier elements which are connected with one another or are jointly mounted on the device that is being measured.

Between the solid measures 2.1 and 2.2 that face each other, a first scanning mechanism 1.1 and a second scanning mechanism 1.2 are mounted. The scanning mechanism 1.1 scans the first solid measure 2.1, while the second scanning mechanism 1.2 scans the second solid measure 2.2. The two scanning mechanisms 1.1 and 1.2 are connected with one another in a mechanically fixed position, e.g. on the two surfaces of a joint carrier element facing the two solid measures 2.1 or 2.2. Solid measures 2.1 and 2.2 and the respectively dedicated scanning mechanisms 1.1 and 1.2 are, other than their symmetrical mirror image arrangement, designed identically. As solid measures 2.1 and 2.2 are firmly connected with one another and scanning mechanisms 1.1 and 1.2 are firmly connected with one another, scanning mechanisms 1.1 and solid measure 2.1 and scanning mechanism 1.2 and solid measure 2.2 displace in identical manner in the direction of measurement X and the scanning mechanism 1.1 and 1.2 thereby generate identical scan signals that are dependent on position.

In the direction of measurement X and in the direction that is perpendicular to the plane of solid measure 2.1, which is not measured, scanning mechanism 1.1 has a scanning distance a1 with respect to solid measure 2.1. Scanning mechanism 1.2 has a scanning distance a2 with respect to the solid measure 2.2 in the direction that is not measured. At optimal reciprocal adjustment of the solid measure 2.1 and 2.2 on the one hand and scanning mechanisms 1.1 and 1.2 on the other hand, scanning distances a1 and a2 are identical. In this case, scanning mechanisms 1.1 and scanning mechanism 1.2 generate identical scanning signals, particularly also scanning signals of identical amplitude. If as a result of mechanical tolerances the respective position of scanning mechanisms 1.1 and 1.2 changes with respect to the solid measures 2.1 and 2.2 in the direction that is not measured during a relative displacement of solid measures 2.1 and 2.2 in the direction of measurement X with respect to scanning mechanisms 1.1 and 1.2, then, the respective scanning distances a1 and a2 also change. Because of the mechanically fixed dedication of the solid measures 2.1 and 2.2 on the one hand and the scanning mechanism 1.1 and 1.2 on the other hand, the scanning distances a1 and a2 thereby change complementary to one another. If scanning distance a1 increases, scanning distance a2 correspondingly decreases by the same amount and the reverse. If scanning distance a1 increases, the scanning signal of first scanning mechanism 1.1 deteriorates because of the dependence on the distance of the scanning of the scan signal, while when the scanning distance a2 decreases, the scanning signal of the second scanning mechanism 1.2 improves and the reverse.

According to the invention, the scanning signals of the two scanning mechanisms 1.1 and 1.2 are now electronically combined, especially added. Thereby, an overall output scanning signal is obtained the quality of which is determined respectively by the scanning signal of that scanning mechanism 1.1 or 1.2 that has the currently smaller scanning distance. Thereby, an output scanning signal is obtained which ensures good discrimination of the position measurement values and a good resolution of the position measurement independent of the relative displacements of scanning mechanisms 1.1 and 1.2 with respect to solid measures 2.1 and 2.2 in the direction that is not measured, i.e. independent of mechanical tolerances in the design and bearing of the solid measure and the scanning mechanism.

In the example of an embodiment in FIG. 2, scanning mechanisms 1.1 and 1.2 are mounted between solid measures 2.1 and 2.2. It can be seen easily that the function and operation in accordance with the invention can also be achieved when the scanning mechanism 1.1 and 1.2 are at a distance from each other in the direction that is not measured, and if the dedicated solid measures 2.1 and 2.2 are located between scanning mechanisms 1.1 and 1.2. Such an arrangement is particularly advantageous when the solid measures displace opposite to locally fixed scanning mechanisms, as this is often the case, particularly also in rotatory position measuring devices. In this case, solid measures 2.1 and 2.2 can also be mounted on a joint carrier element. Solid measures 2.1 and 2.2 can, for example be mounted on both surfaces of a rotating carrier disk. Particularly, it is possible to design a carrier element with a single solid measure that can be scanned from both sides in the same manner by scanning mechanism 1.1 and 1.2. Such an embodiment is possible especially for inductive and magnetic scanning.

The invention claimed is:

1. Position measuring device with a solid measure and a scanning mechanism, whereby the solid measure and the scanning mechanism are displaceable relative to one another in a direction of measurement and have a distance in a direction that is not measured which is perpendicular to the direction of measurement, and whereby a quality of a scan signal generated by the scanning mechanism is dependent on the direction in the distance that is not measured, comprising: a first and second solid measure and a first and second scanning mechanism, wherein: the first and second solid measure and the first and second scanning mechanism are respectively designed identically but mirrored in a plane including the direction of measurement and perpendicular to the direction that is not measured, the first and second solid measure are mounted in a fixed opposite position in a direction that is not measured; the first and the second scanning mechanism are mounted in a fixed opposite position in the direction that is not measured; at least one of the first and second scanning mechanisms scans at least one of the first and second measures using a method selected from the group consisting of optically, capacitively, inductively and magnetically; the scanning signals generated by the first and second scanning mechanisms respectively are electronically combined into an output scanning signal; and amplitudes of at least two scanning signals are added.

2. Position measuring device according to claim 1, wherein the first and second scanning mechanisms are mounted between the first and second solid measures relative to the direction that is not measured.

3. Position measuring device according to claim 1, wherein the first and the second solid measures are mounted between the first and second scanning mechanisms relative to the direction that is not measured.

4. Position measuring device according to claim 3, wherein the first and the second solid measures are mounted on a joint carrier element.

5. Position measuring device according to claim 4, wherein at least one of the first and second solid measures is scanned by opposite sides of the joint carrier element by at least one of the first and second scanning mechanisms.

6. Position measurement device according to claim 1, wherein the first and second scanning mechanisms are mounted between the first and second solid measures relative to the direction that is not measured.

7. Position measuring device according to claim 1, wherein the first and the second solid measures are mounted between the first and second scanning mechanisms relative to the direction that is not measured.

* * * * *